United States Patent [19]
Peterson, Jr. et al.

[11] 3,743,155
[45] July 3, 1973

[54] APPARATUS FOR FEEDING SHEET MATERIAL

[75] Inventors: Russell I. Peterson, Jr., Seekonk, Mass.; David R. Coady, Thompson, Conn.

[73] Assignee: Cumberland Engineering Company, Pawtucket, R.I.

[22] Filed: Jan. 18, 1972

[21] Appl. No.: 218,735

[52] U.S. Cl. .................... 226/171, 226/176, 83/355
[51] Int. Cl. ............................................. B65h 17/34
[58] Field of Search .................. 226/171, 172, 176; 271/75; 83/355

[56] References Cited
UNITED STATES PATENTS
| | | | |
|---|---|---|---|
| 3,266,799 | 8/1966 | Ingalls | 226/172 |
| 681,015 | 8/1901 | Brewster | 271/75 |
| 3,605,541 | 9/1971 | Ruben et al. | 83/355 |
| 2,870,839 | 1/1959 | Duane | 83/355 X |
| 3,491,637 | 1/1970 | Hasten | 83/355 X |

Primary Examiner—Allen N. Knowles
Attorney—Albert P. Davis, Townsend M. Gunn et al.

[57] ABSTRACT

A combined feed and hold-down device for plastic cutting machines in which the feed of the stock is at an angle to the cutting apparatus, comprising a plurality of progressively shorter, moving belts positioned above the machine feed table, the forward ends of the belts lying in close proximity to the cutting means and parallel therewith, and the rear end of the belts extending at right angles across the feed table of the apparatus, the assembly of belts and their guide means being pivoted at the rear so that the forward ends may bear against the material just as the latter enters the cutting means.

9 Claims, 5 Drawing Figures

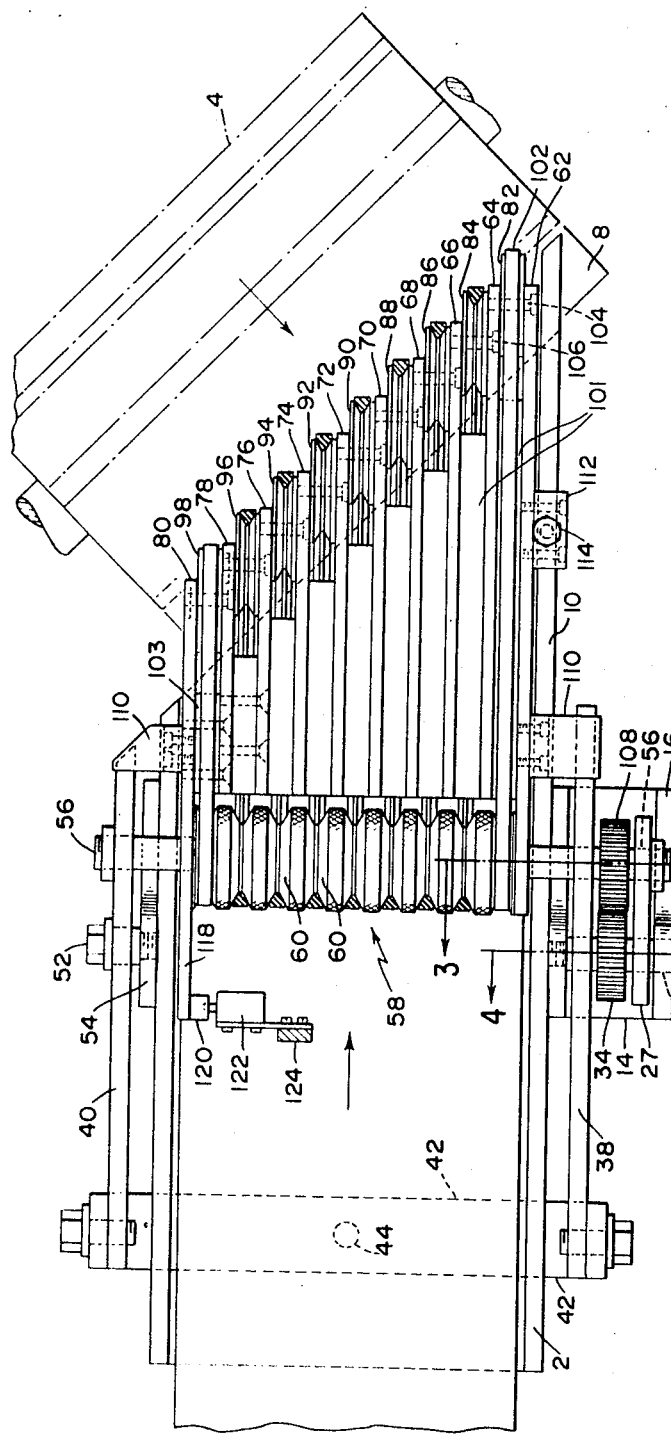
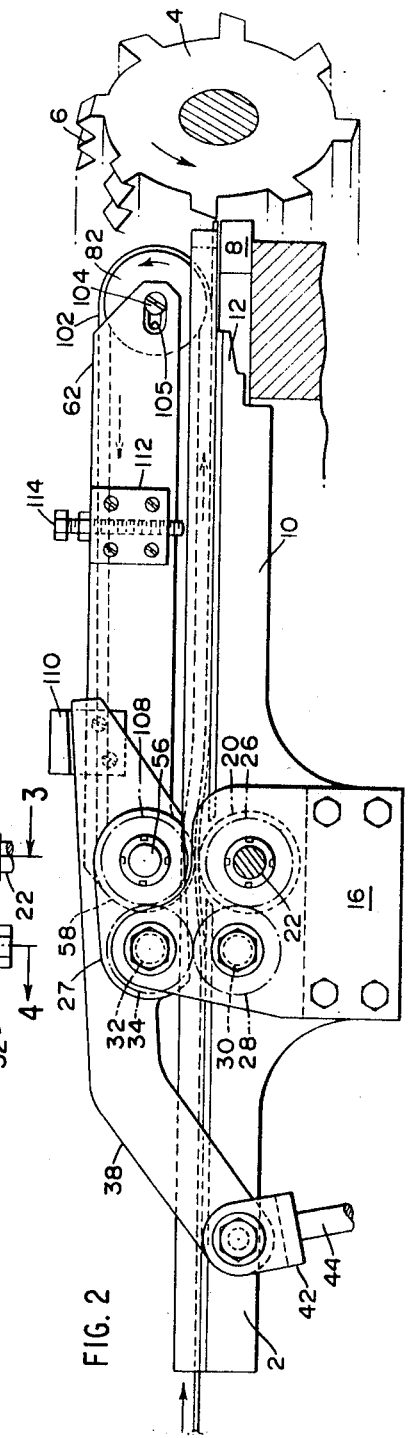
FIG. 1
FIG. 2

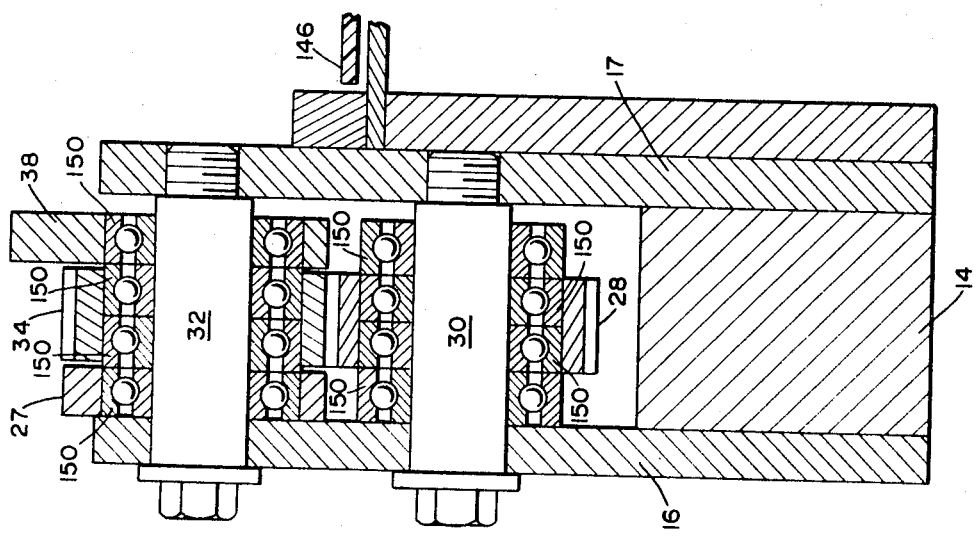
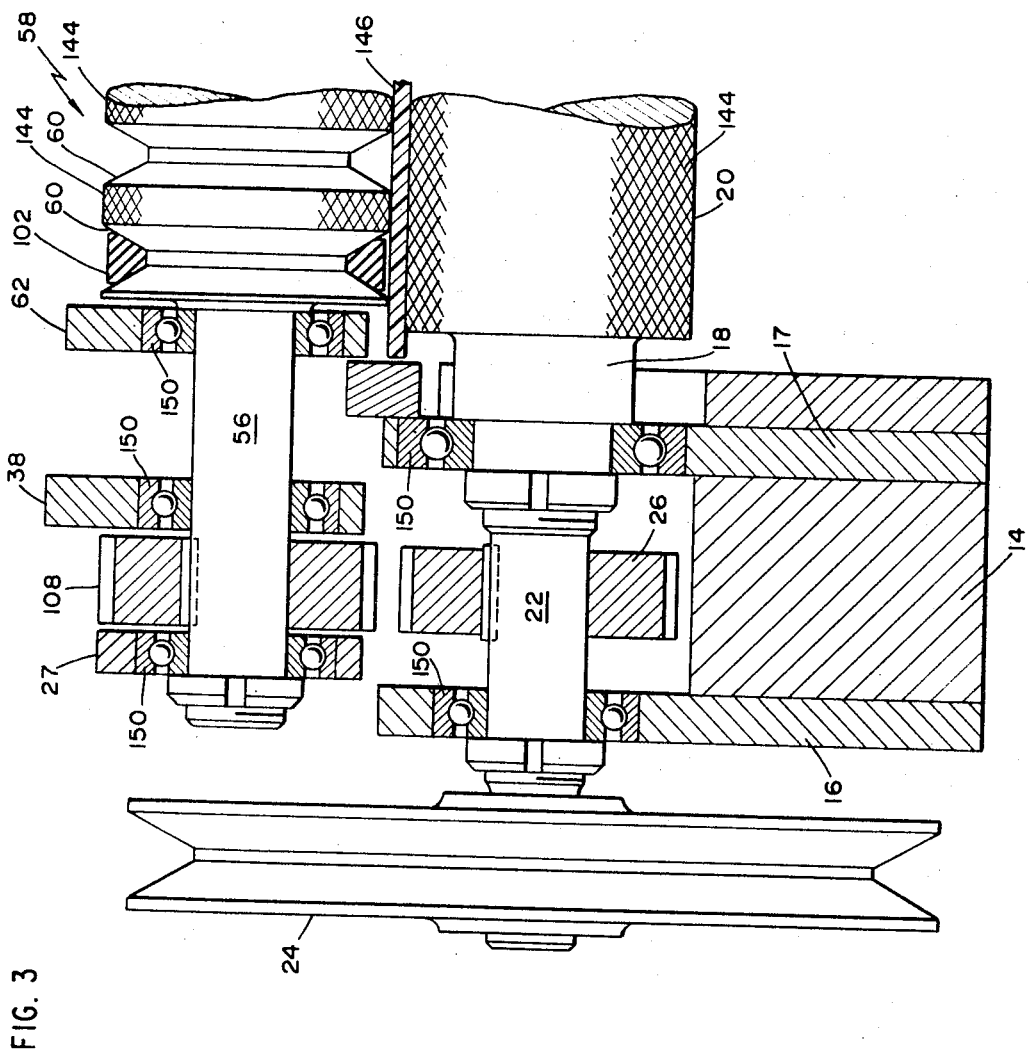

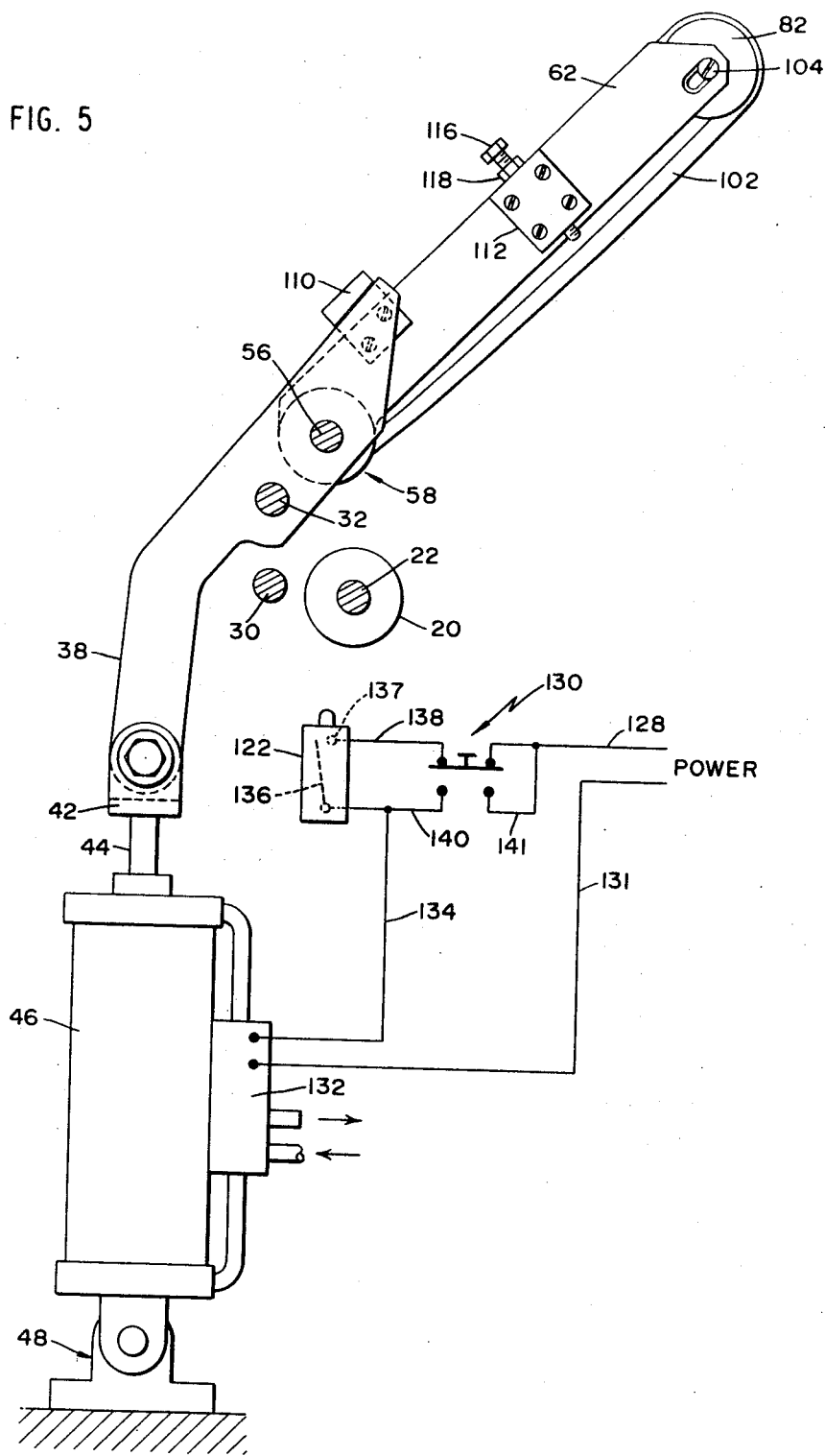

APPARATUS FOR FEEDING SHEET MATERIAL

BACKGROUND OF THE INVENTION

The material used in the molding of synthetic resins is many times supplied by the plastics manufacturer in the form of small pellets. In view of considerations, such as the packing factor in the molds as well as in shipping and uniformity of pellets, the latter are oftentimes furnished in the form of eight sided polygonal pellets. Such pellets are cut from flat sheet stock using what are called dicing machines, which generally have stationary notched cutting teeth which mesh therewith, the latter being mounted on a rotor. The sheet stock is fed into the machine at an angle to the cutters, so that the teeth cut eight-sided pellets from the sheet of material being fed.

One of the difficulties encountered is the problem of feeding the material to the cutters along a feed table in such manner that the material stays flat and does not wrinkle. Another problem is slidably holding the material flat as it enters the cutting teeth.

This has been accomplished in the past by the use of relatively expensive and complicated feeding and hold-down devices, all of which needlessly add to the expense of the dicing machine itself as well as requiring maintenance due to their complexity.

SUMMARY OF THE INVENTION

It is the general purpose of this invention to provide a machine in which a combined feeding device and hold-down is used which is relatively inexpensive and simple to make, virtually fool-proof in operation, and requiring minimum maintenance. The device can be adjusted for sheet plastic stock of several thicknesses, and provides a hold-down portion thereof which is in close proximity to the cutting edges of the dicing machine. The apparatus may be conveniently elevated away from the feed table and the cutting mechanism in order to clean the machine, or in order to make adjustments to the machine itself.

Accordingly, among the several objects and advantages of the invention may be noted the following:

One object of the invention is the provision of a combined feeding and hold-down device for plastic cutting machinery, which is relatively simple and inexpensive to construct.

Another object of the invention is the provision of a feeding and hold-down device of the above kind, which may be adjusted to accommodate and feed properly various thicknesses of sheet material.

Yet another object of the invention is the provision of feeding and hold-down devices of either of the above kinds, in which the device provides for holding the stock being fed flatly against the feed table in close proximity to the cutting knives of the machine, while permitting the smooth flow of stock into the knives.

Other objects and advantages will be in part apparent and in part pointed out hereinafter in the following description.

The invention accordingly comprises the elements and combinations of elements, features of construction, and arrangements of parts which will be exemplified in the structures hereinafter described, and the scope of the application of which will be indicated in the appended claims.

In the accompanying drawings, in which is illustrated one embodiment of the invention:

FIG. 1 is a plan view of the embodiment, illustrating in detail the combined feed and hold-down mechanism itself, but with the remaining portion of the machine with which the mechanism may be used being shown schematically;

FIG. 2 is an elevation of the embodiment of FIG. 1;

FIG. 3 is a front elevation of a portion of the machine, the view being taken in the direction of sight lines 3—3 on FIG. 1;

FIG. 4 is a front elevation of a portion of the FIG. 1 embodiment, taken in the direction of sight lines 4—4 on FIG. 1; and FIG. 5 is an elevation of the embodiment of FIG. 1 combined with further apparatus for the pneumatic control thereof, the apparatus being shown in an elevated position.

Throughout the drawings, like parts will be designated by like reference numerals. Dimensions of certain of the parts as shown in the drawings may have been modified and/or exaggerated for the purposes of clarity of illustration and understanding of the invention.

Referring now to FIG. 1, one of several possible embodiments of the invention is shown. A frame and feed table 2 of a dicing machine is illustrated in generally schematic form, and a rotary cutting means 4 is also shown schematically at one end of table 2, the cutting means being provided with the plurality of teeth 6 mounted thereon. It will be understood that rotary knife cutting mechanism 4 is driven by a suitable motor in conventional manner. Table 2 provides a forward feed section 10 terminating at end 12 where there is mounted a bed knife 8 having teeth that mesh with teeth 6. The cutting mechanism of such a machine is well known, a typical machine being those made by Cumberland Engineering Company Inc. of Pawtucket, Rhode Island, and known as Stair-Step Dicing Machine. This invention is particularly applicable to dicing machines, where the sheet material is fed at an angle into the cutting means of the machines.

Mounted on one side of frame 2 is a U-shape support comprising upright plates 16, 17 separated by spacer 14. A single upright 54 is provided on the opposite side of bed 2. The uprights are provided with suitable bearing holes in which is mounted the ends 18 of a lower feed roller 20, the ends passing freely through the bed or frame 2. Feed roll 20 has knurled surface 144. Feed roller 20 terminates in the shaft 22 which extends through the upright plate 16 by means of the suitable bearing as shown in FIG. 3. Attached to the end of the shaft 22 is a drive pulley 24. Mounted on the shaft 22 is a spur gear 26 which engages a spur gear 28 (see FIG. 4) mounted on stub shaft 30, the latter being firmly and suitable fastened between the plates 16 and 17. Gear 28 is mounted on and between suitable ball bearings (radial and thrust) so as to rotate freely on the shaft 30.

Throughout the description, the single numeral 150 has been used to identify all of the various ball bearings and thrust bearings, since these are conventional and their use is well understood by persons skilled in the art.

Extending between the upper end of the plate 16 and 17 is a second stub shaft 32 which is suitably fastened in the plates. Rotatably mounted on suitable bearings on shaft 32 is a spur gear 34 which engages the bear 28. Thus, when the pulley 24 is driven, it rotates shaft 22 which in turn will rotate gear 34 via the gears 26 and 28.

Mounted on each side of the bed 2 are lateral side supports 38 and 40, support 40 being shorter in length than support 38. The difference in length is such that when the apparatus is mounted on the dicing machine, a line joining the forward ends of these supports is approximately parallel to the bed knife 8, that is, to the cutting zone of the machine. The rear ends of the supports 38 and 40 bend downwardly as shown, and are joined together by the transverse connecting yoke 42 which lies underneath the bed 2 of the machine. The center of the yoke is attached to the piston 44 of a hydraulic or air cylinder 46 (see FIG. 5) the bottom end of which is rotatably attached to the bed of the machine in conventional manner by the clevis and tongue structure generally indicated by numeral 48.

Side supports 38 and 40 are both rotatably mounted at the sides of the machine, member 38 being rotatably mounted on the stub shaft 32, and support 40 being rotatably mounted on a short stub shaft 52 fastened onto support 54 on the other side of the machine. Thus, when the piston 44 is retracted into its cylinder 46, this will pull the ends of the support members 38 and 40 downward thus rotating these arms about the stub shafts 32 and 52.

On a shaft 56 which extends through the forward ends of the side supports 38 and 40 is mounted a knurled, upper feed roll generally indicated by numeral 58, this feed roll being provided with a plurality of grooves 60 as shown in FIGS. 1 and 3, in this instance there being nine such grooves. Upper feed roll 58 may be integral with the shaft 56, or it may be made separately and keyed in conventional manner to its shaft so that it is turned thereby.

Between the side supports 38 and 40 there is provided a series of elongated support members 62, 64, 66, 68, 70, 72, 74, 76, 78 and 80. These supports are separated by spacers 81, and the supports and spacers are bolted together to form a unit. It will be appreciated that while in the instant embodiment ten such support members are provided, more or less may be provided, as desired. It has been found that for a typical machine, the ten shown are sufficient for providing adequate strength for the hold-down device, adequate weight, sufficient rigidity, and ease of manufacturing.

It is critical that the support members and spacers vary progressively in length, with each support member (except for support 64) being progressively shorter than the preceding adjacent one in a direction taken across the table. That is, support 66 is shorter than support 64, and so forth, with support 80 being the shortest of all. Support 64 is the same length as outside support 62. The spacers also are progressively shorter from one side of the machine to the other, and are shorter than adjacent supports so as to provide free end spaces for the insertion of pulleys as follows:

Rotatably mounted on short shafts 104 extending between adjacent forward ends of the support members 61–80 and in said free spaces ahead of the spacers, are a plurality of pulleys 82, 84, 86, 88, 90, 92, 94, 96 and 98. Thus, it will be noted that there are nine pulleys which correspond to the nine grooves 60 in the top feed roll 58. It will also be noted that each of the nine forward pulleys is aligned with a respective groove in the top feed roll.

It is also critical that the positioning of the forward pulleys 82–98 is such that a vertical plane to which the periphery of these forward rolls is tangential will be approximately parallel to the bed knife and thus to the cutting zone of the apparatus. It is also to be noted that in view of the fact that the forward pulleys 82–98 can be and preferably are relatively small in diameter, the point vertically below the axis of each pulley will also lie very close to the cutting zone of the machine.

Trained on each pair of pulley grooves, for example, on the pulley 82 and its corresponding groove 60 in feed roll 58 is a flat V-belt 102, the fit of the V-belts in the respective grooves of the forward pulleys (82–98) being such that the back of the belts project out of the pulleys. By this means, the bottom reaches of the belts define a movable surface which is adjacent the top of the stationary feed table 10. By turning the feed roll 58 counter-clockwise as viewed in FIG. 2, this movable surface is caused to move toward the cutting zone. The moving surface at its forward end, and for a portion of its remainder will engage the top surface of material lying on feed table 10 to hold it down and also to assist feed rolls 20 and 58 to move the material to the cutting zone. However, it will be observed that because of the fact that the forward pulleys and thus the forward ends of said bottom reaches are near the cutting zone, the material being cut will be pressed against the forward end of table 10 just prior to cutting. That is, the hold-down pressure of the apparatus is maintained with a smooth forward motion of the material being fed up to the immediate proximity of the cutting teeth of the apparatus.

The fit of the V-belts 102 in the grooves 60 of feed roll 58 is preferably such that the backs of the belts are recessed slightly within the grooves. Thus, the knurled outer peripheries of both feed roll 58 and feed roll 20 directly engage stock 146 being fed into the cutting zone of the machine.

For clarity of illustration, all of the V-belts have been given the number 102, even though it will be observed that the V-belts themselves are progressively shorter, as one progresses across the width of the machine, in order to be suitably tensioned on the shorter distance between the axis of shaft 56 and the respective short shaft of the respective forward pulley. The short pulley shafts may be adjusted by providing slots 105 in which the bolts holding the shafts between adjacent supports may be slid prior to tightening, each shaft being provided with a conventional flanged and slotted head, as shown, and having its other end provided with a shouldered and threaded portion. The heads bear against the faces of recesses as shown, and the nuts at the other ends of the shafts fit non-rotatably in similar recesses provided in the adjacent support.

To assemble this part of the apparatus, supports 78 and the shortest spacer 101, are attached to support 80 using machine screws. Pulley 98 is mounted on its shaft and the shortest belt is trained on drive roll 58 and pulley 98. The latter is adjusted to tighten the belt.

Then, in successive order, a support (76 for example) and a spacer are attached to the preceding support, a pulley and belt are put in place, and the pulley is adjusted to tension the belt.

This step by step assembly is continued until all supports, pulleys, belts and spacers are assembled with the belts in proper tension.

Suitable rotation of the drive roll 58 is obtained by fastening thereto a gear 108 whose teeth engage the teeth of the gear 34. Thus, when the shaft 22 is rotated, feed roll 58 will be turned (via gears 26, 28, 34 and 108) counter-clockwise in a direction opposite that of bottom feed roll 20 in order to feed material between the rolls and toward the cutting zone of the machine. Such feeding is, of course, greatly assisted by the motion toward the feed roll of the movable surface defined by the bottom reaches of the respective belts trained on the pulleys and on the top feed roll as explained above.

Fastened to the outer support members 62 and 80 are fingers 110 which overly the ends of the support members 38 and 40. As a result, when these support members are rotated about shafts 32 and 52, their forward ends catch the fingers 110 (see FIGS. 3 and 5) and raise upwardly the entire assembly of the supports 62–80, the pulleys 82–98, and the belts 102 as shown in FIG. 5, thus giving access to both the bed of the machine and the cutting means. A contrary motion of the support 38 and 40 about the shafts will lower the above assembly to the position shown in FIGS. 1 and 2.

The down position of the feed means may be limited, if desired, by a bracket 112 fastened to support member 52, through which is threaded the adjusting screw 114 with a conventional lock nut 116. The lower end of screw 114 bears against the edge of table 10.

An arm 118 (shown here as an integral extension of support 80 although it may be separately attached thereto) extends to the rear of roll 58. Attached to the end of this arm is a projection 120 which, when the apparatus is in the position shown in FIG. 2, will engage the button of a push-button switch 122, the latter being fastened by conventional means 124 to the bed of the machine.

A simple wiring diagram for actuation of the piston 46 is shown in connection with FIG. 5, and includes switch 122 which is shown as being normally open when the apparatus is in the FIG. 2 position, that is, the projection 120 is engaging the switch push button. Manually actuated two position switch 130 is shown a first contact of which is connected by wire 128 to one side of the power line, the other side of the latter being connected by wire 131 to the control solenoid 132 of piston 46. The other side of the control solenoid is connected by wire 134 to contact arm 136 of switch 122. The other contact 137 of switch 122 is connected by wire 138 to a second contact of switch 130. Contact arm 136 of switch 122 is connected by wire 140 to a third contact of switch 130 as shown, and the fourth contact of switch 130 is connected by wire 141 to the side of the power line to which the first contact of switch 130 is connected.

During operation of the device, if material starts to jam underneath the hold-down device, this will rise with the result that the projection 120 will leave the push button of the switch 122. This will cause the contact arm 136 to close the contacts of the switch, with the result that the solenoid 132 of cylinder 46 will become actuated, and piston 46 will retract into the cylinder as shown in FIG. 5, thus elevating the hold-down apparatus. After the jam has been cleared, then by actuating switch 130 to close its third and fourth contacts, the solenoid 132 is again actuated, with the result that the piston 44 will extend from the cylinder to move the apparatus to the position shown in FIG. 2. The push button 130 is kept manually actuated until the projection 120 actuates switch 122 to open its contacts again.

Of course, at any time that it is desired manually to actuate the hold-down device to the upright position shown in FIG. 5, all that is necessary is to energize solenoid 132 by manually closing the third and fourth contacts (as drawn) of the switch 130.

It will also be observed that when the hold-down apparatus is in the raised position shown in FIG. 5, actuation of the drive pulley 24 by its motor will still drive the gears 26, 28, 34 and 108 to turn the feed roll 58. Thus, the operation of the belts may be observed, particularly from the underneath side where the bottom reach of the several belts can be seen.

It has been indicated above that the belts lie completely within the grooves in the drive roll 58 but project from the grooves in the pulleys 82–98. This is one form that the machine can take. However, instead of having the belts recessed in the grooves of the feed roll 58, the grooves in the latter are made small enough so that the backs of the belts lie outside the outer periphery of the pulleys, with the result that the feed roll itself does not touch the stock as the stock is fed. In some instances, it may be found desirable to use such a construction.

In view of the above, it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. In a macchine for cutting sheet material in which the cutting means of the machine is at an angle to the direction of feed of the material into the machine, a combined feed and hold-down apparatus, comprising:

- a feed table having inner and outer ends and mounted with the inner end adjacent said cutting means;
- a first feed roll having a first shaft mounted in supports at the outer end of the table and rotatable for urging said sheet material toward the cutting means;
- a second roll rotatably mounted on a second shaft above the first roll and movable toward and away from the latter, the second roll having peripheral grooves in its perimeter at spaced intervals along its length for receiving entrained thereon endless belts, and said second shaft extending across said table perpendicularly to the direction of said feed;
- means for rotating both of said rolls;
- a plurality of parallel, adjacent elongated support members movably mounted above said feed table and extending from a position adjacent the second roll toward the cutting means, each support member extending progressively a shorter distance from said position toward said cutting means, whereby the forward ends thereof lie generally in a line parallel to said cutting means and adjacent thereto;

a plurality of pulleys equal in number to said grooves mounted adjacent said cutting means between said forward ends, the pulleys being so positioned that a vertical plane tangential to their perimeters is approximately parallel to said cutting means, said pulleys being laterally so spaced as to align each with one of said grooves;

a plurality of said endless belts trained on said grooves and pulleys, the bottom reaches of said belts defining a surface movable toward said cutting means and adapted to lie adjacent the length of said table; and means for moving said belts and the support members toward said table whereby at least the forward end of said moving surface is adapted to press against said material in proximity to said cutting means.

2. The apparatus of claim 1 in which said elongated support members are pivotally mounted on the bed of said machine about the axis of said second shaft.

3. The apparatus of claim 1 in which said second roll constitutes a feed roll and is adapted to be moved toward the first feed roll sufficiently so that it engages said sheet material and feeds it, in conjunction with said first feed roll, toward said cutting means.

4. The apparatus of claim 1 in which the outer faces of said belts project beyond the peripheries of the respective pulleys.

5. The apparatus of claim 4 in which said belts projects beyond the periphery of said second roll and the latter is adapted to be moved toward said first feed roll sufficiently so that the outer faces of said belts engage the top surface of said sheet material.

6. The apparatus of claim 4 in which the outer faces of said belts are recessed within the periphery of said second roll, and said second roll is adapted to be moved toward said first feed roll sufficiently so that the periphery of the second roll engages the top surface of said sheet material.

7. The apparatus of claim 2 including means for rotating said second roll, said elongated support members and said belts as a unit about a third shaft mounted in support means therefor attached to the machine, thereby to raise said unit away from said feed table and cutting means.

8. The apparatus of claim 7 in which said means for rotating said uint comprises at least one elongated lever rotatably mounted on said third shaft, a finger attached to at least one of said elongated support members and overlying the end of said one elongated lever, and means for moving said end of the elongated lever in a direction to cause said one end to engage said finger and swing said second roll, said elongated support members and said belts upwardly away from said table.

9. The apparatus of claim 8 in which said drive means for rotating said second roll and said belts, comprises:

means for turning the shaft of the first roll;

a first gear attached to said first shaft and turnable therewith;

a second gear meshing with the first gear and rotatably mounted on a fourth shaft held in said support means;

a third gear meshing with the second gear and rotatably mounted on said third shaft;

a fourth gear mounted on and attached to said second shaft, and meshing with said third gear but not with the first gear;

said second shaft being supported by said elongated lever whereby, when said elongated lever is rotated about said third shaft, said fourth gear and second roll are swung about said third shaft, with said first, second, third and fourth gears still in engagement.

* * * * *